(12) United States Patent
Iwasaki et al.

(10) Patent No.: US 8,373,910 B2
(45) Date of Patent: Feb. 12, 2013

(54) IMAGE SCANNING DEVICE AND IMAGE FORMING APPARATUS

(75) Inventors: Takeshi Iwasaki, Saitama (JP); Hiroshi Takahashi, Kanagawa (JP); Kazushi Takei, Tokyo (JP); Norikazu Taki, Kanagawa (JP); Hideaki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 388 days.

(21) Appl. No.: 12/805,608

(22) Filed: Aug. 10, 2010

(65) Prior Publication Data

US 2011/0051200 A1 Mar. 3, 2011

(30) Foreign Application Priority Data

Sep. 3, 2009 (JP) ................................. 2009-203733

(51) Int. Cl.
*H04N 1/04* (2006.01)

(52) U.S. Cl. ........ 358/474; 358/513; 358/514; 358/483; 399/211; 382/312

(58) Field of Classification Search .................. 358/474, 358/483, 482, 496, 497, 513, 514, 512, 506; 382/312, 318, 319; 399/211, 212
See application file for complete search history.

(56) References Cited

U.S. PATENT DOCUMENTS

| | | | |
|---|---|---|---|
| 4,691,114 A * | 9/1987 | Hasegawa et al. | 358/474 |
| 5,274,456 A * | 12/1993 | Izumi et al. | 348/335 |
| 6,181,411 B1 * | 1/2001 | Harris et al. | 356/4.01 |
| 6,348,981 B1 * | 2/2002 | Walsh | 358/474 |
| 6,424,434 B1 * | 7/2002 | Uchida | 358/474 |
| 7,460,279 B2 | 12/2008 | Iwasaki | |
| 7,636,181 B2 * | 12/2009 | Iwasaki | 358/483 |
| 7,936,486 B2 * | 5/2011 | Shin | 358/474 |
| 8,111,295 B2 * | 2/2012 | Makimoto et al. | 348/208.99 |
| 2005/0111064 A1 | 5/2005 | Iwasaki | |
| 2006/0152777 A1 | 7/2006 | Iwasaki | |

FOREIGN PATENT DOCUMENTS

| | | |
|---|---|---|
| JP | 05-336301 | 12/1993 |
| JP | 2572307 | 10/1996 |
| JP | 2002-314768 | 10/2002 |

(Continued)

OTHER PUBLICATIONS

Abstract of JP 2002-137438 published May 14, 2002.

(Continued)

*Primary Examiner* — Negussie Worku
(74) *Attorney, Agent, or Firm* — Harness, Dickey & Pierce, P.L.C.

(57) ABSTRACT

An image scanning device includes a base part; and multiple image sensors each including a substrate, a line sensor including scanning elements arranged on the substrate, and a holder for holding the substrate. The base part holds the image sensors such that the scanning elements of an image sensor partly overlap the scanning elements of an adjacent image sensor in the main-scanning direction. The coefficients of linear expansion of the substrate and the base part are substantially the same; the holder and the base part are fixed together at a first fixing point; the holder and the substrate are fixed together at a second fixing point; and the distance in the main-scanning direction between the first fixing point and the second fixing point and the direction of the second fixing point with respect to the first fixing point are the same for all the image sensors.

10 Claims, 14 Drawing Sheets

FOREIGN PATENT DOCUMENTS

| | | |
|---|---|---|
| JP | 2003-087504 | 3/2003 |
| JP | 2004-336201 | 11/2004 |
| JP | 2005-198254 | 7/2005 |
| JP | 3784249 | 3/2006 |

OTHER PUBLICATIONS

Abstract of JP 04-223659 published Aug. 13, 1992.

* cited by examiner

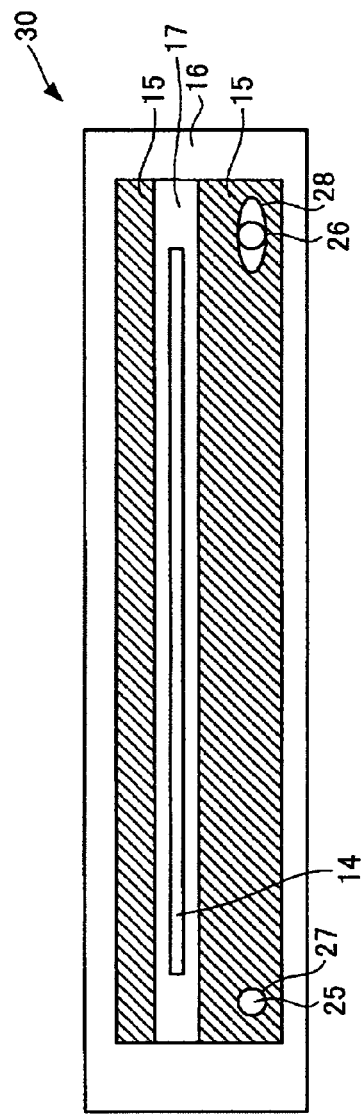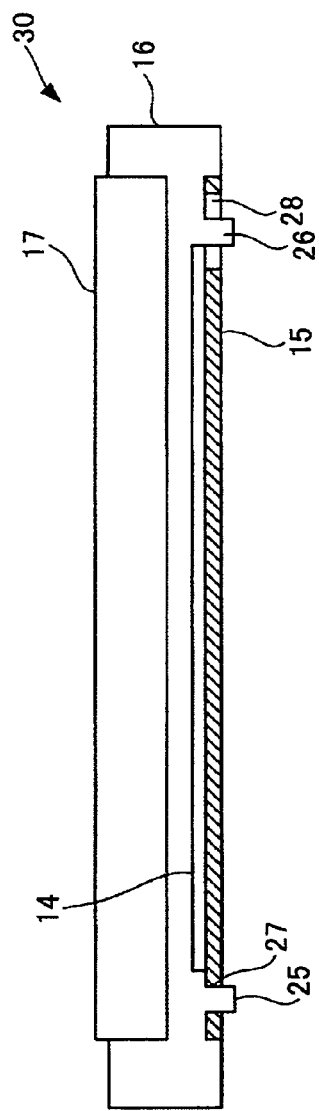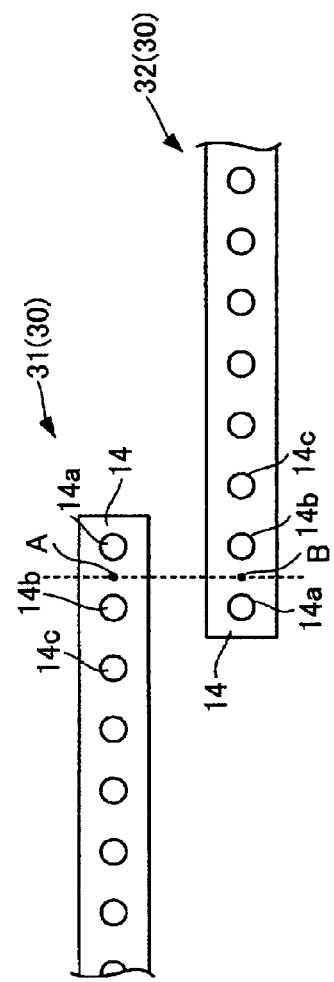

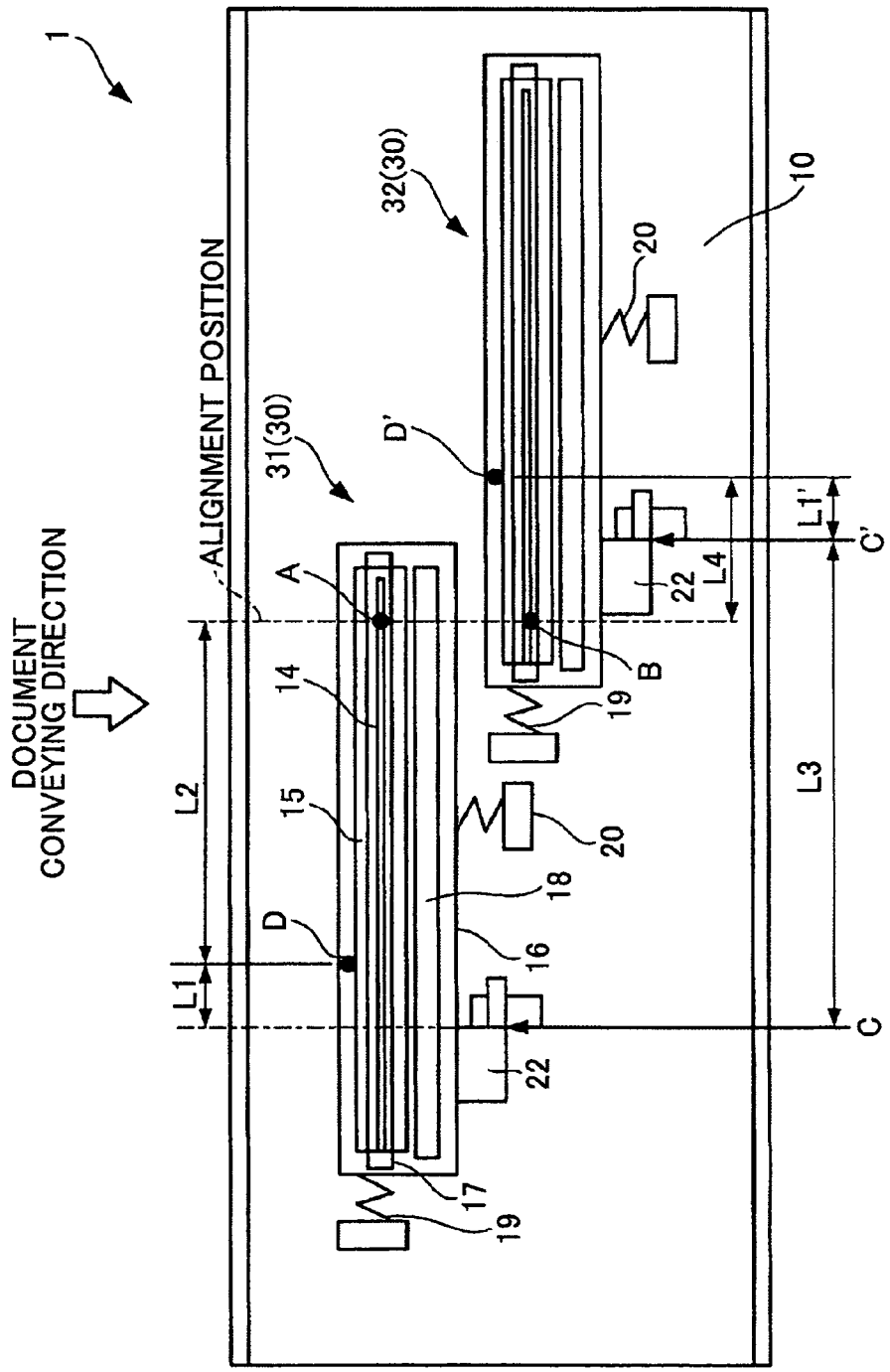

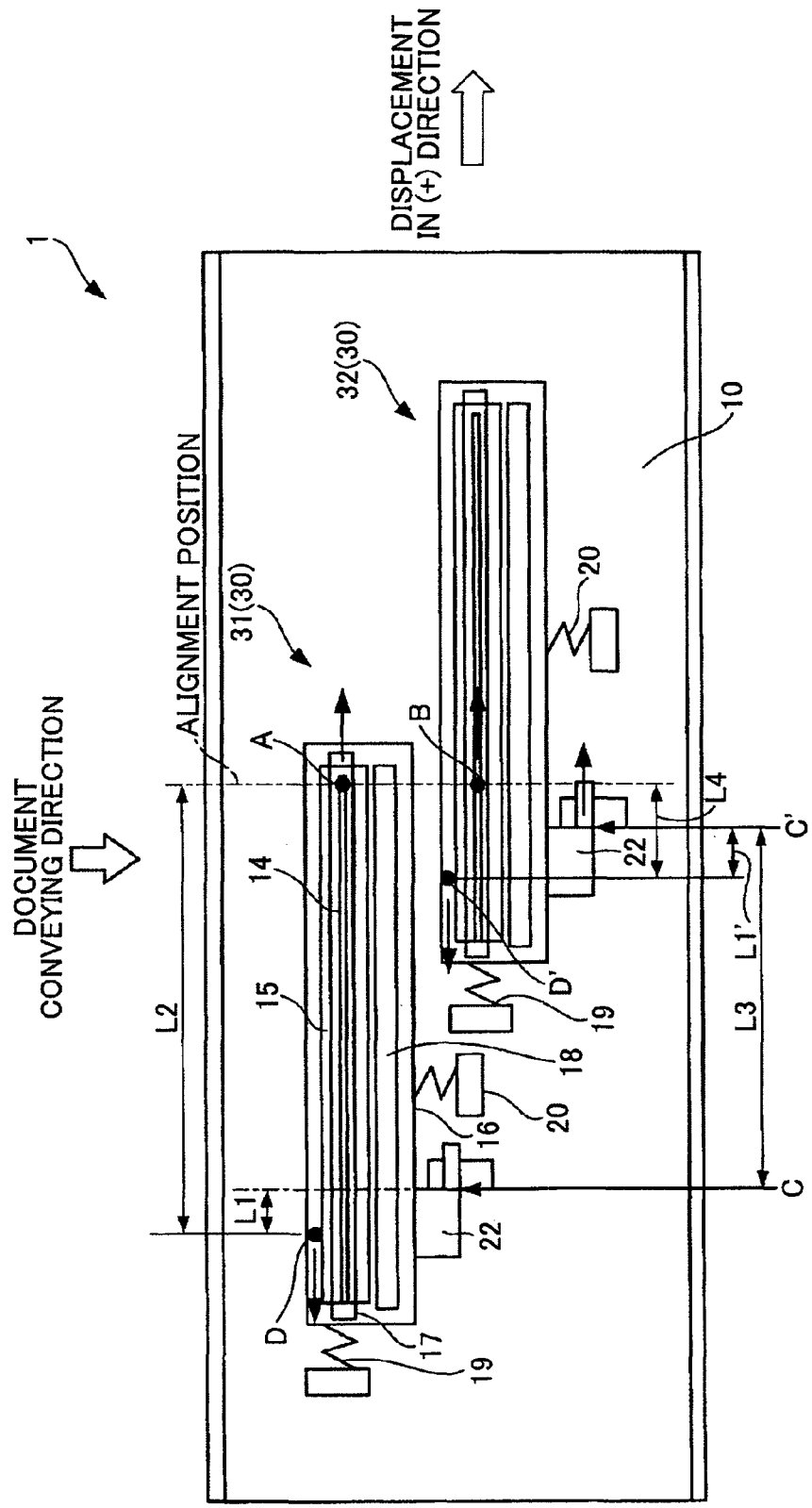

IMAGE SCANNING DEVICE AND IMAGE FORMING APPARATUS

BACKGROUND OF THE INVENTION

1. Field of the Invention

An aspect of the present invention relates to an image scanning device and an image forming apparatus including the image scanning device.

2. Description of the Related Art

Generally, in an image scanning device, multiple image sensors are arranged alternately (i.e., staggered) such that the end portions of adjacent image sensors partly overlap each other in the main-scanning direction. Compared with a case where one image sensor with a large width is used, using mass-produced, inexpensive image sensors with a small width (e.g., A4 or A3 size) makes it possible to reduce the costs of parts of an image scanning device. However, using multiple image sensors makes it necessary to adjust the mechanical alignment of the image sensors and complicates image processing (e.g., it is necessary to combine images obtained by the respective image sensors). Also, if the positional relationship between image sensors changes due to, for example, thermal expansion, images obtained by the image sensors may be misaligned.

Various technologies have been proposed to solve or reduce the above problems. For example, Japanese Patent Application Publication No. 2004-336201 discloses a technology where multiple image sensors are joined together via fitting parts provided on the housings of the image sensors so that "alignment points" of the image sensors can be easily aligned. Here, "alignment points" of image sensors indicate points on the image sensors at which the image sensors are aligned with each other.

As another example, Japanese Patent Application Publication No. 2003-87504 discloses a technology where materials with the same coefficient of linear expansion are used for the housing of an image sensor and a supporting frame to prevent deformation of the image sensor fixed to the supporting frame due to thermal expansion.

Also, Japanese Patent Application Publication No. 2002-314768 discloses an image scanning device including a temperature sensor for detecting the temperature near image sensors. In the disclosed image scanning device, scanning start pixels and scanning end pixels at the seam between the image sensors are controlled according to temperature changes to compensate for misalignment of the image sensors due to the temperature changes.

Also, Japanese Patent Application Publication No. 5-336301, Japanese Patent No. 2572307, and Japanese Patent Application Publication No. 2005-198254 disclose a technology where sensor substrates of adjacent image sensors are connected to each other to reduce the misalignment of the image sensors in the main-scanning direction due to thermal expansion.

Further, Japanese Patent No. 3784249 discloses an optical writing device where multiple light-emitting element arrays are staggered in the main-scanning direction and connected to each other in a manner similar to Japanese Patent Application Publication No. 5-336301, Japanese Patent No. 2572307, and Japanese Patent Application Publication No. 2005-198254 in order to reduce occurrence of undesired lines in an image at the seams between the light-emitting element arrays.

However, the disclosed technologies have disadvantages as described below. In the technology disclosed in Japanese Patent Application Publication No. 2004-336201, misalignment of the alignment points of image sensors caused by thermal expansion is not taken into account.

In the technology disclosed in Japanese Patent Application Publication No. 2003-87504, the coefficient of linear expansion of the sensor substrate is not taken into account. Therefore, when multiple image sensors are staggered, alignment points of the image sensors may be misaligned due to thermal expansion.

With the image scanning device disclosed in Japanese Patent Application Publication No. 2002-314768, the control accuracy may be reduced by the difference between the actual changes in image sensor sizes due to temperature changes and the changes in image sensor sizes estimated based on the temperature detected by the temperature sensor. Also, the disclosed configuration requires a temperature sensor and a control unit and therefore increases production costs.

With the technology disclosed in Japanese Patent Application Publication No. 5-336301, Japanese Patent No. 2572307, Japanese Patent Application Publication No. 2005-198254, and Japanese Patent No. 3784249, it is necessary to fix connecting parts to the sensor substrates with an adhesive or screws. This may increase the risk of damaging the sensor substrates.

SUMMARY OF THE INVENTION

In an aspect of this disclosure, there is provided an image scanning device. The image scanning device includes multiple image sensors and a base part. Each of the image sensors includes a substrate; a line sensor including scanning elements that photoelectrically convert light from a document and are arranged on the substrate in a main-scanning direction so as to form a line; and a holder for holding the substrate. The base part holds the image sensors such that the scanning elements at an end of an image sensor partly overlap the scanning elements at an end of an adjacent image sensor in the main-scanning direction. In the image scanning device, the coefficient of linear expansion of the substrate is substantially the same as the coefficient of linear expansion of the base part; the holder and the base part are fixed together at a first fixing point; the holder and the substrate are fixed together at a second fixing point; the distance in the main-scanning direction between the first fixing point and the second fixing point is the same for all the image sensors; and the direction of the second fixing point with respect to the first fixing point is the same for all the image sensors.

BRIEF DESCRIPTION OF THE DRAWINGS

FIG. 6A is a top view of a contact image sensor (CIS), FIG. 6B is a side view of a CIS, and FIG. 6C is a drawing illustrating scanning elements at a seam between CISs;

FIG. 7 is a drawing used to describe displacement of CISs;

FIG. 13 is a drawing illustrating displacement of alignment points of CISs in a sixth case;

DESCRIPTION OF THE PREFERRED EMBODIMENTS

Preferred embodiments of the present invention are described below with reference to the accompanying drawings.

First, an exemplary configuration of an image forming apparatus 50 is described with reference to FIG. 1.

Figure 1:
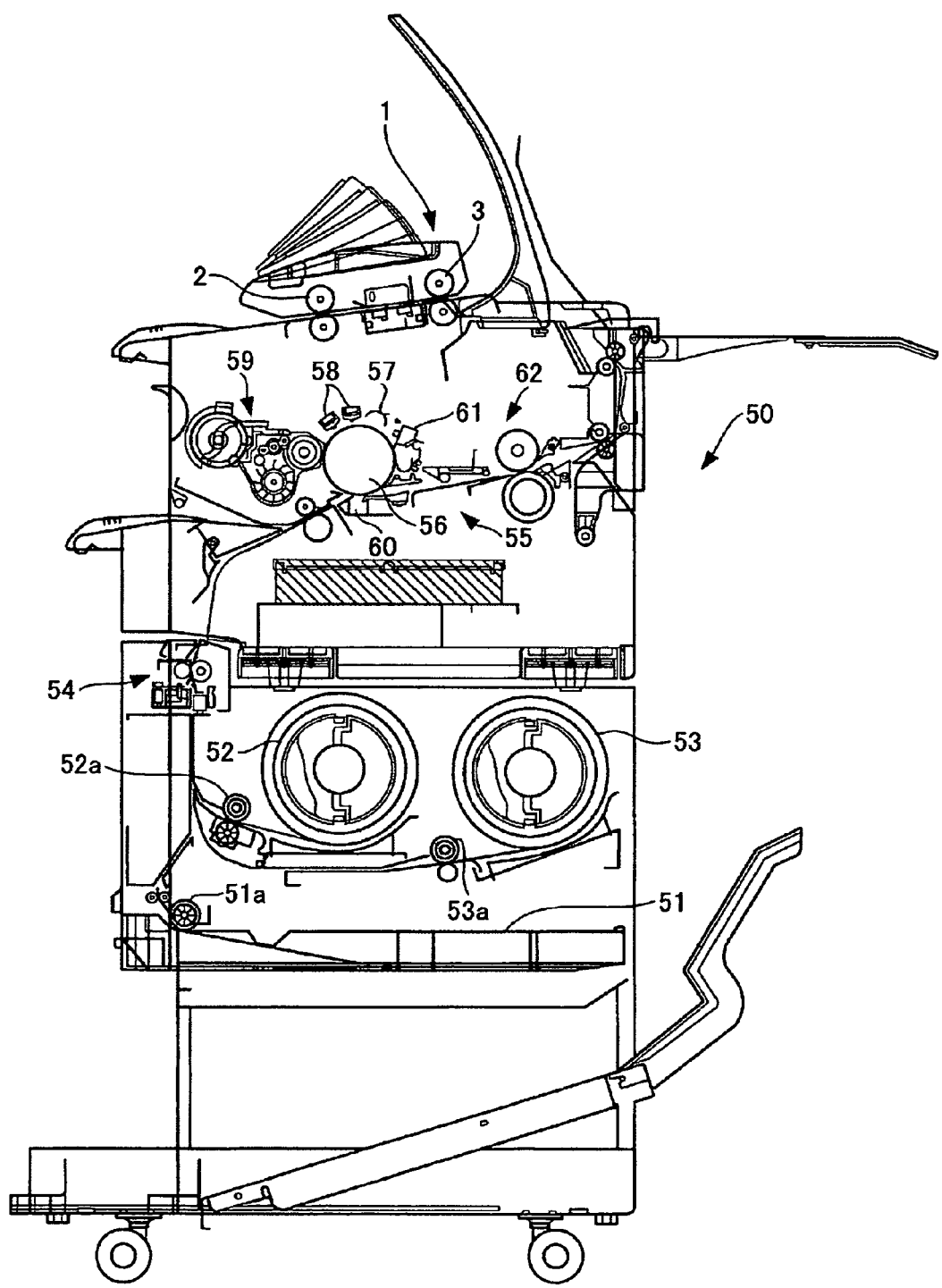
FIG. 1 is a schematic diagram of an image forming apparatus according to an embodiment of the present invention.

As shown in FIG. 1, the image forming apparatus 50 includes an image scanning device 1 placed in the upper part of the image forming apparatus 50. In this embodiment, the image forming apparatus 50 is configured as a copier. Alternatively, the image forming apparatus 50 may be configured as a printer, a facsimile machine, or so on. The image forming apparatus 50 also includes a paper-feed cassette 51 for containing sheets of recording paper and paper-feed cassettes 52 and 53 for containing rolls of recording paper. The recording paper contained in the paper-feed cassettes 51 through 53 is fed by paper-feed rollers 51a, 52a, and 53a and is conveyed upward by a conveying roller 54 to an image forming unit 55.

The image forming unit 55 forms an image on the recording paper and includes a photosensitive drum 56; a charging unit 57 for charging the photosensitive drum 56; an illuminating unit 58 for forming an electrostatic latent image on the photosensitive drum 56 according to an image signal; a developing unit 59 for developing the electrostatic latent image on the photosensitive drum 56 with toner; a transfer unit 60 for transferring the developed image (toner image) onto the recording paper; a cleaning unit 61 for removing toner remaining on the photosensitive drum 56 after the toner image is transferred onto the recording paper; and a fusing unit 62 for fusing the toner image onto the recording paper.

Figure 2:
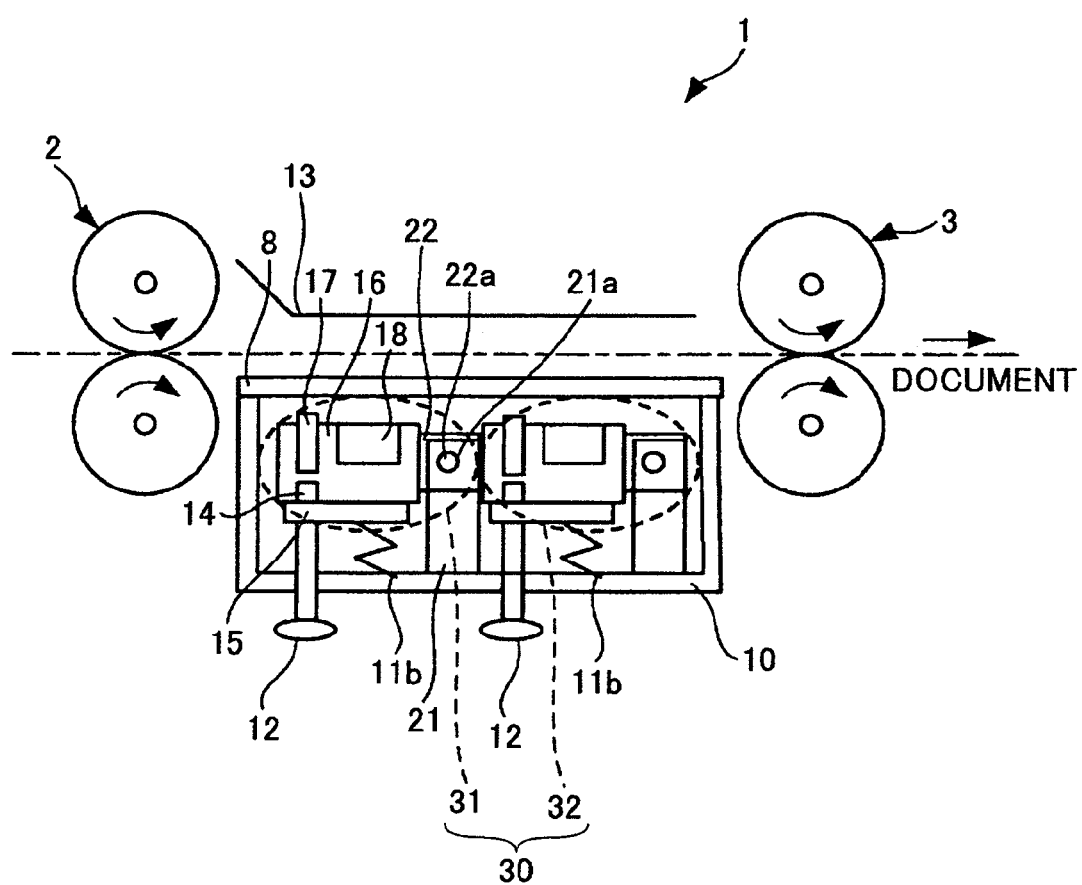
FIG. 2 is a schematic diagram of an image scanning device according to an embodiment of the present invention.

Referring to FIG. 2, the image scanning device 1 includes an input conveying roller pair 2 for conveying a document onto a contact glass 8; multiple contact image sensors (CISs) 30 for scanning the document on the contact glass 8; a pressing plate 13 for guiding the document on the contact glass 8 and for pressing the document onto the contact glass 8; an output conveying roller pair 3 for ejecting the scanned document in a direction opposite to the input direction; and a base part 10 for holding the CISs 30.

The CISs 30 include first CISs 31 and second CISs 32. The first CISs 31 are disposed upstream of the second CISs 32 in the document conveying direction and configured to scan parts of the document conveyed by the input conveying roller pair 2. The second CISs 32 are disposed downstream of the first CISs 31 in the document conveying direction at a predetermined distance from the first CISs 31 and configured to scan the remaining parts of the document. The first CISs 31 and the second CISs 32 are arranged alternately (or staggered) such that their end portions overlap each other and they form a zigzag line across the entire scanning range in the main-scanning direction (from one end to the other end in the width direction of the document being conveyed). The main-scanning direction indicates a direction in which the CISs 30 extend and are arranged. Meanwhile, a sub-scanning direction indicates a direction that is orthogonal to the main-scanning direction and in which the document is conveyed.

The first CISs 31 and the second CISs 32 have substantially the same configuration except that they are disposed in different positions.

Therefore, in the descriptions below, the first CISs 31 and the second CISs 32 may be collectively called the CISs 30 or the CIS 30 when distinction is not necessary. Also in the descriptions below, one first CIS 31 and one second CIS 32 may be used for brevity.

The base part 10 has a box shape with an opening facing upward or a square-bracket shape in the side view, and is disposed below the contact glass 8 such that the opening is closed by the contact glass 8.

A first support part 21 having a slide hole 21a is fixed to the bottom of the base part 10, and a second support part 22 having a slide pin 22a is fixed to a side wall of a sensor holder 16 of the CIS 30. The slide pin 22a is movably fitted into the slide hole 21a, and the CIS 30 is thereby held in the base part 10. The CIS 30 can be moved closer to or away from the contact glass 8 by rotating the CIS 30 around the slide pin 22a. The distance between the CIS 30 and the contact glass 8 can be adjusted by a focus adjusting screw 12. Also, the CIS 30 is biased by a focus-direction pressure spring 11b and a focus-direction pressure spring 11a (see FIGS. 4 and 5) downward, i.e., toward the focus adjusting screw 12. Thus, the focus-direction pressure spring 11b and the focus-direction pressure spring 11a maintain the distance between the CIS 30 and the contact glass 8 which is adjusted by the focus adjusting screw 12. The focus-direction pressure springs 11a and 11b may be implemented as coil springs as shown in FIG. 2 or as flat springs as shown in FIGS. 4 and 5.

Figure 3:
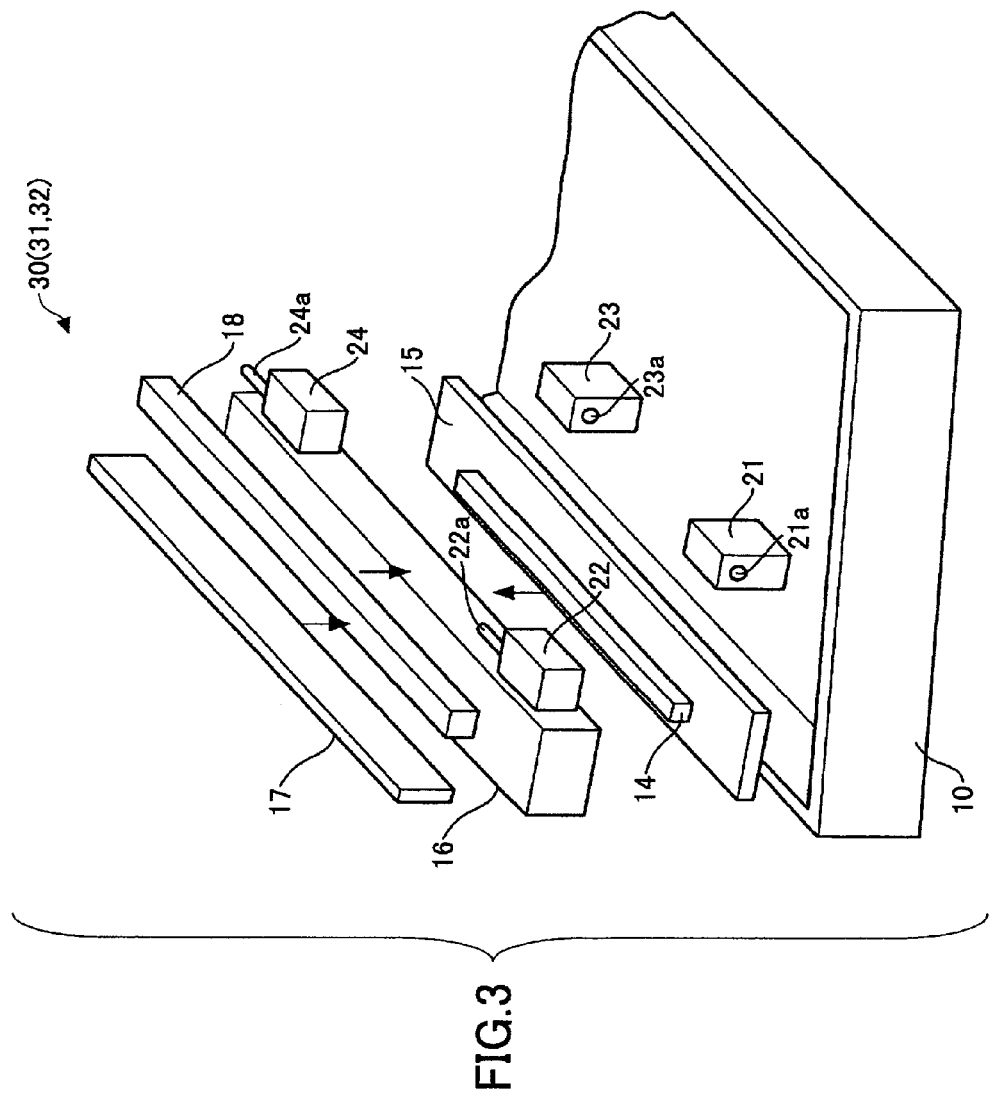
FIG. 3 is a drawing illustrating a contact image sensor (CIS) and a base part of an image scanning device according to an embodiment of the present invention.

Referring to FIG. 3, the CIS 30 includes an illuminating unit 18, a lens 17, a line sensor 14, a sensor substrate 15 on which the line sensor 14 is mounted, and the sensor holder 16 for holding these components. When the illuminating unit 18 illuminates a document, light reflected from the document is focused on the line sensor 14 by the lens 17, and the line sensor 14 photoelectrically converts the focused light. The lens 17 is implemented, for example, by a Selfoc lens. In addition to the second support part 22 shown in FIG. 2, a second support part 24 having a slide pin 24a is provided on the side wall of the sensor holder 16 at a position away from the second support part 22 in the main-scanning direction. In addition to the first support part 21 shown in FIG. 2, a first support part 23 having a slide hole 23a is provided on the bottom of the sensor holder 10 at a position away from the first support part 21 in the main-scanning direction. With the slide pins 22a and 24a of the second support parts 22 and 24 movably fitted into the corresponding slide holes 21a and 23a of the first support parts 21 and 23, the CIS 30 is held on the base part 10. In this embodiment, the base part 10 is made of sheet iron with a coefficient of linear expansion of $11.7 \times 10^{-6}/°C$, and the sensor substrate 15 is made of glass epoxy with a coefficient of linear expansion of $12 \times 10^{-6}/°C$. Thus, in this embodiment, the coefficients of linear expansion of the base part 10 and the sensor substrate 15 are substantially the same.

Figure 4:
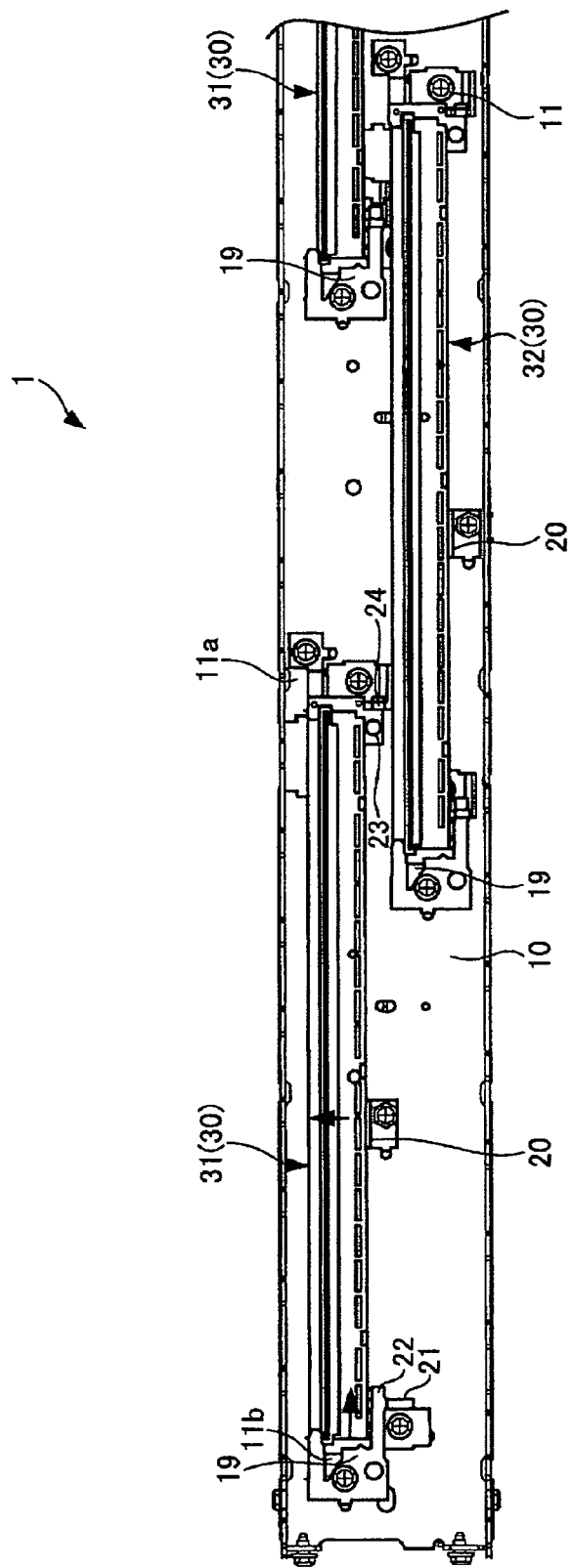
FIG. 4 is a top view of an image scanning device according to an embodiment of the present invention.
Figure 5:
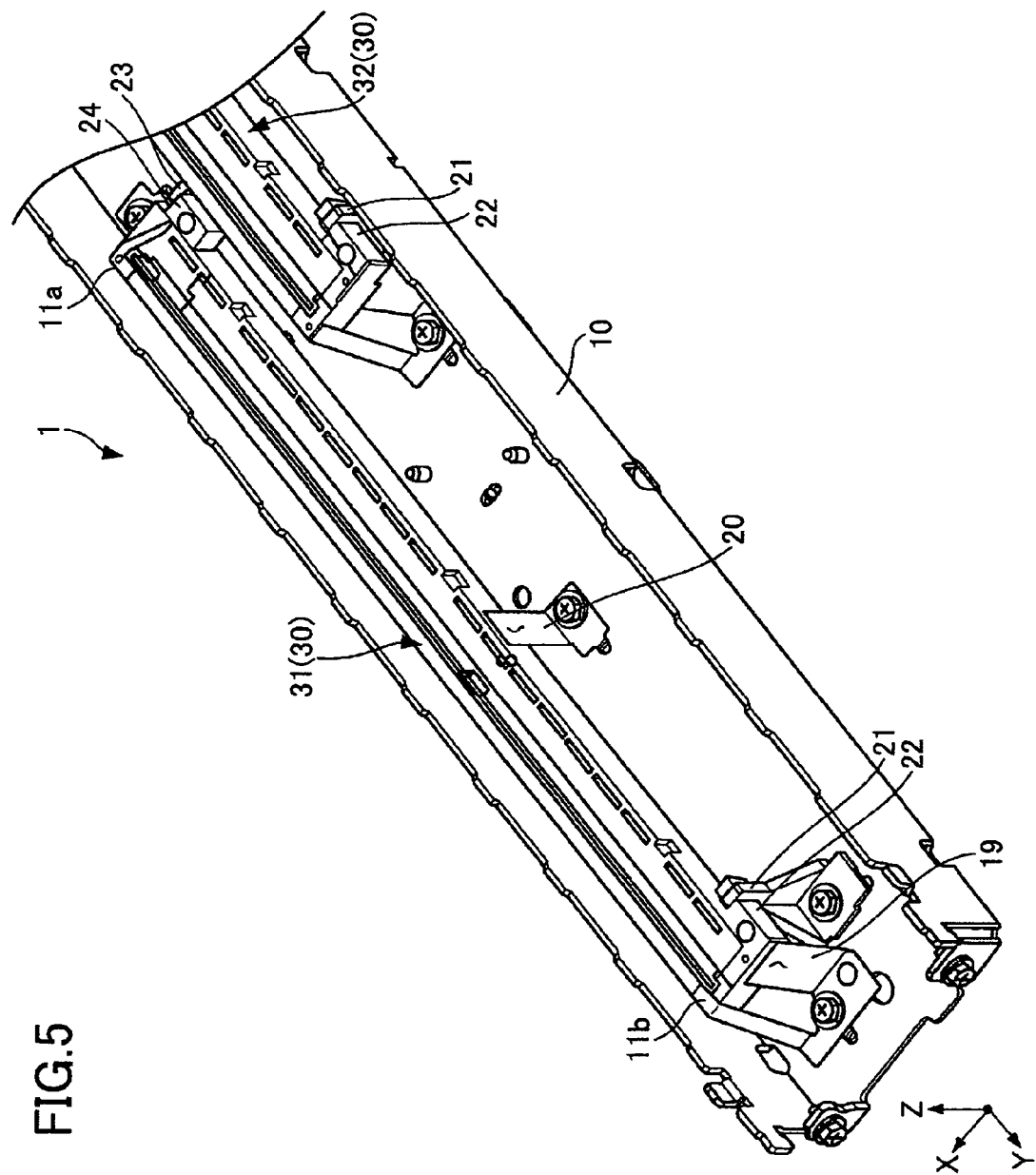
FIG. 5 is a perspective view of an image scanning device according to an embodiment of the present invention.

As shown in FIGS. 4 and 5, the first CISs 31 and the second CISs 32 are arranged alternately (i.e., staggered) on the base part 10 such that adjacent CISs 31 and 32 are apart from each other in the sub-scanning direction and the end portions of the adjacent CISs 31 and 32 partly overlap each other in the main-scanning direction.

The CIS 30 held on the base part 10 by the first support parts 21 and 23 and the second support parts 22 and 24 is biased (or pressed) by a main-scanning-direction pressure spring 19 in the main-scanning direction. The main-scanning-direction pressure spring 19 is implemented, for example, by a flat spring and presses one end of the CIS 30 in the main-scanning direction toward the other end of the CIS 30. The main-scanning-direction pressure spring 19 has a protruding part sticking out toward the CIS 30 to press the end of the CIS 30. A base of the main-scanning-direction pressure spring 19 and a base of the focus-direction pressure spring 11b are integrated. In other words, they share the same base. When the CIS 30 is being biased by the main-scanning-direction pressure spring 19 in the main-scanning direction, the second support part 22 closer to the main-scanning-direction pressure spring 19 is pressed against the first support part 21 and the second support part 24 farther from the main-scanning-direction pressure spring 19 is positioned at a distance from the first support part 23 in the main-scanning direction (a gap is present between the second support part 24 and the first support part 23).

With this configuration, even when the CIS 30 and the base part 10 expand due to heat, the change in the positional relationship between the CIS 30 and the base part 10 at the position of the second support part 22 closer to the main-scanning-direction pressure spring 19 is restricted because the second support part 22 is pressed against the first support part 21. In other words, the CIS 30 and the base part 10 are fixed together at the position of the second support part 22 such that their positional relationship in the main-scanning direction does not change. Hereafter, the position of the second support part 22 closer to the main-scanning-direction pressure spring 19 may be called a displacement restricting position.

Meanwhile, the gap in the main-scanning direction between the first support part 23 and the second support part 24 allows the slide pin 24a to slide in the slide hole 23. This in turn allows the positional relationship between the CIS 30 and the base part 10 at the position of the second support part 24 to change in the main-scanning direction according to the difference in the coefficient of linear expansion between the sensor holder 16 of the CIS 30 and the base part 30. Hereafter, the position of the second support part 24 farther from the main-scanning-direction pressure spring 19 may be called a displacement allowing position.

The CIS 30 held on the base part 10 by the first support parts 21 and 23 and the second support parts 22 and 24 is also biased (or pressed) by a sub-scanning-direction pressure spring 20 in the sub-scanning direction to maintain its position in the sub-scanning direction. The sub-scanning-direction pressure spring 20 has a protruding part sticking out toward the CIS 30 to press the side of the CIS 30.

Referring to FIGS. 6A and 6B, two protrusions 25 and 26 that are apart from each other in the main-scanning direction are provided on the lower side of the sensor holder 16 of the CIS 30, and the sensor substrate 15 has a hole 27 into which the protrusion 25 is inserted and a long hole 28 into which the protrusion 26 is inserted. The hole 27 has a circular shape having substantially the same diameter as that of the protrusion 25. The long hole 28 has a minor axis in the sub-scanning direction that is substantially the same as the diameter of the protrusion 26 and a major axis in the main-scanning direction that is longer than the diameter of the protrusion 26.

Since the hole 27 has a circular shape having substantially the same diameter as that of the protrusion 25, the change in the positional relationship between the sensor substrate 15 and the sensor holder 16 at the position where the protrusion 25 is inserted into the hole 27 is restricted even when the CIS 30 expands due to heat. In other words, the sensor substrate 15 and the sensor holder 16 are fixed together at the position where the protrusion 25 is inserted into the hole 27 such that their positional relationship in the main-scanning direction does not change. Hereafter, the position where the protrusion 25 is inserted into the hole 27 may be called a displacement restricting position.

Meanwhile, since the long hole 28 has a major axis in the main-scanning direction that is longer than the diameter of the protrusion 26, the positional relationship between the sensor substrate 15 and the sensor holder 16 at the position where the protrusion 26 is inserted into the long hole 28 is allowed to change in the main-scanning direction according to the difference in the coefficient of linear expansion between the sensor substrate 15 and the sensor holder 16. Hereafter, the position where the protrusion 26 is inserted into the long hole 28 may be called a displacement allowing position.

As described above, the first CISs 31 and the second CISs 32 have substantially the same configuration except that they are disposed in different positions. Therefore, the distance in the main-scanning direction between the displacement restricting position (the position of the second support part 22) of the CIS 30 and the base part 10 and the displacement restricting position (where the protrusion 25 is inserted into the hole 27) of the sensor substrate 15 and the sensor holder 16 is the same for all the CISs 30 including the first CISs 31 and the second CISs 32.

Also, the direction of the displacement restricting position (where the protrusion 25 is inserted into the hole 27) of the sensor substrate 15 and the sensor holder 16 with respect to the displacement restricting position (the position of the second support part 22) of the CIS 30 and the base part 10 (or the positional relationship between the displacement restricting positions) is the same for all the CISs 30 including the first CISs 31 and the second CISs 32.

Referring to FIG. 6C, the line sensor 14 includes multiple scanning elements 14a, 14b, 14c, ... that are arranged in a line in the main-scanning direction. Among the scanning elements 14a, 14b, 14c, ... of the line sensor 14, the scanning elements 14a in the end portions of the first CIS 31 and the second CIS 32 overlapping each other in the main-scanning direction are not used for image scanning. In other words, the scanning elements 14b, 14c, ... of the line sensor 14 of the first CIS 31 and the scanning elements 14b, 14c, ... of the line sensor 14 of the second CIS 32 are actually used for image scanning. In this embodiment, the pixel density of the line sensor 14 is 600 dpi (dots per inch).

Effects of the image scanning device 1 of this embodiment are described below.

In FIG. 7, a point A indicates the alignment point of the first CIS 31 and a point B indicates the alignment point of the second CIS 32. The points A and B move in the main-scanning direction when the first CIS 31, the second CIS 32, and the base part 10 expand due to heat.

Also in FIG. 7, a point C indicates the displacement restricting position of the first CIS 31, a point C' indicates the displacement restricting position of the second CIS 32, a point D indicates the displacement restricting position of the sensor substrate 15 and the sensor holder 16 of the first CIS 31, and a point D' indicates the displacement restricting position of the sensor substrate 15 and the sensor holder 16 of the second CIS 32. FIGS. 8 through 13 correspond to six different cases and show various positional relationships between the points A, B, C, C', D, and D'. In each case, the points A and B are displaced in the same direction by the same amount when thermal expansion occurs. This indicates that the points A and B are not misaligned even when thermal expansion occurs. The point C or C' indicating the displacement restricting position corresponding to the second support part 22 may be called a first fixing point, and the point D or D' indicating the displacement restricting position where the protrusion 25 is inserted into the hole 27 may be called a second fixing point.

In FIGS. 7 through 13, L1 indicates a distance between the points C and D, L1' indicates a distance between the points C' and D', L2 indicates a distance between the points D and A, L3 indicates a distance between the points C and C', and L4 indicates a distance between the points B and D'. Here, it is assumed that the coefficient of linear expansion of the base part 10 is S1, the coefficient of linear expansion of the sensor substrate 15 is S2, the coefficient of linear expansion of the sensor holder 16 is S3, and the amount of temperature change (rise) is $\Delta t$. Also, L1=L1' is true because the first CIS 31 and the second CIS 32 have substantially the same configuration except that they are placed in different positions on the base part 10.

Figure 8:
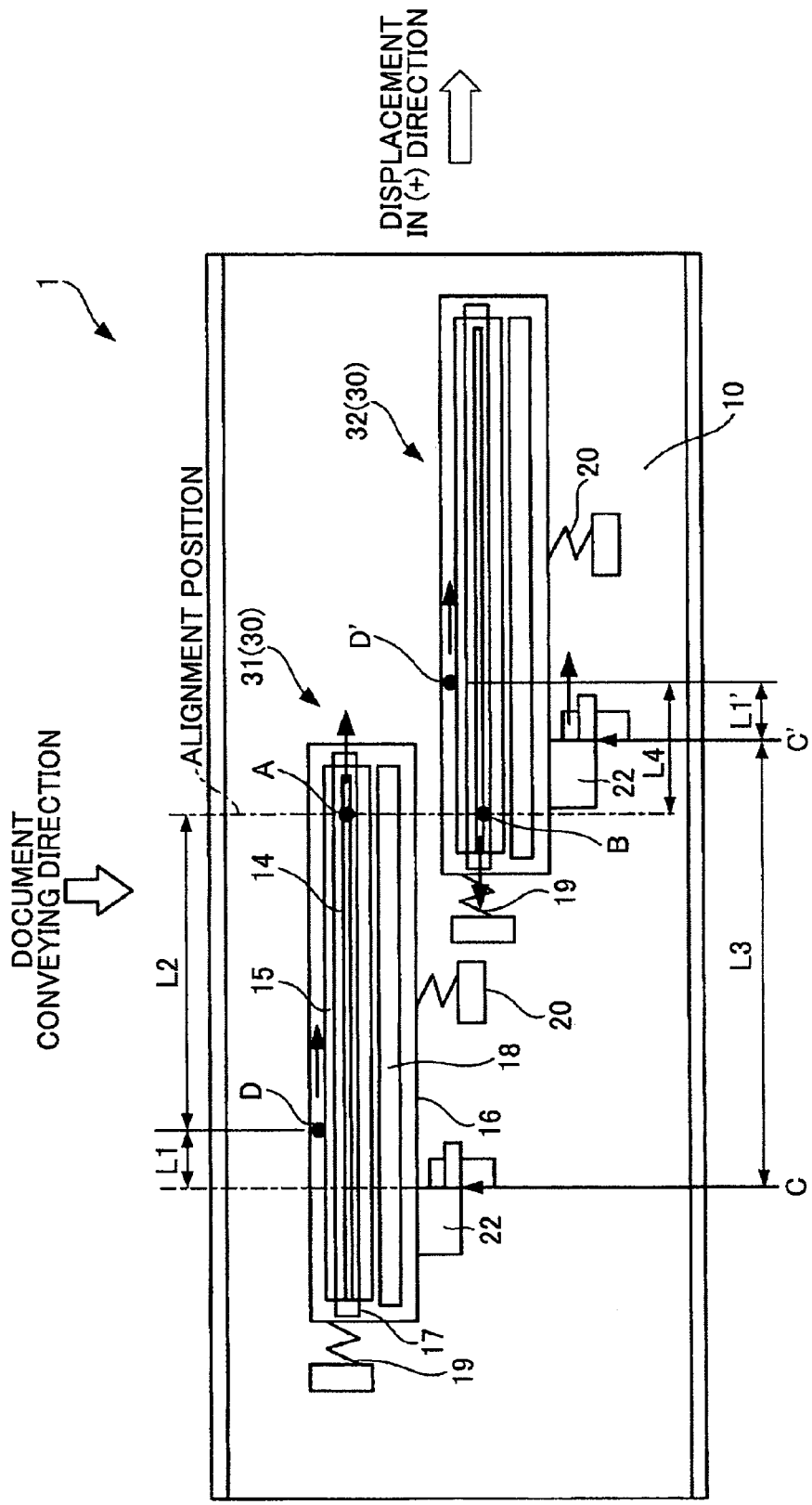
FIG. 8 is a drawing illustrating displacement of alignment points of CISs in a first case.

FIG. 8 shows a first case where the point D is to the right of the point C, the point B is to the left of the point C', and the point D' is to the right of the point C'.

In the descriptions below, (+) represents the rightward movement of the points in figures and (−) represents the leftward movement of the points in figures.

An amount of movement $\Delta A1$ of the sensor holder 16 of the first CIS 31 due to thermal expansion is represented by the amount of movement of the point D with respect to the point C. In the first case, the point D moves in the (+) direction by $\Delta A1 = L1 \times S3 \times \Delta t$.

An amount of movement $\Delta A2$ of the sensor substrate 15 of the first CIS 31 due to thermal expansion is represented by the amount of movement of the point A with respect to the point D. In the first case, the point A moves in the (+) direction by $\Delta A2 = L2 \times S2 \times \Delta t$.

Since the sensor substrate 15 and the sensor holder 16 are fixed together at the point D, the sensor substrate 15 also moves by the amount of movement $\Delta A1$.

Accordingly, the total amount of movement $\Delta A$ of the point A, which is the alignment point of the first CIS 31, is represented by $\Delta A = \Delta A1 + \Delta A2 = L1 \times S3 \times \Delta t + L2 \times S2 \times \Delta t$.

An amount of movement $\Delta B1$ of the sensor holder 16 of the second CIS 32 due to thermal expansion is represented by the amount of movement of the point D' with respect to the point C'. In the first case, the point D' moves in the (+) direction by $\Delta B1 = L1' \times S3 \times \Delta t$.

An amount of movement $\Delta B2$ of the sensor substrate 15 of the second CIS 32 due to thermal expansion is represented by the amount of movement of the point B with respect to the point D'. In the first case, the point B moves in the (−) direction by $\Delta B2 = -(L4 \times S2 \times \Delta t)$.

An amount of movement $\Delta B3$ of the base part 10 due to thermal expansion is represented by the amount of movement of the point C' with respect to the point C. In the first case, the point C' moves in the (+) direction by $\Delta B3 = L3 \times S1 \times \Delta t$.

Accordingly, the total amount of movement $\Delta B$ of the point B, which is the alignment point of the second CIS 32, is represented by $\Delta B = \Delta B1 + \Delta B2 + \Delta B3 = L1' \times S3 \times \Delta t - L4 \times S2 \times \Delta t + L3 \times S1 \times \Delta t$.

Here, since L1+L2+L4=L3+L1' and L1=L1', L2=L3−L4 is true. Also, it is assumed that $S1 \approx S2$.

Therefore, $\Delta A$ equals $\Delta B$. This indicates that thermal expansion causes substantially no misalignment between the points A and B that are the alignment points of the first CIS 31 and the second CIS 32.

Figure 9:
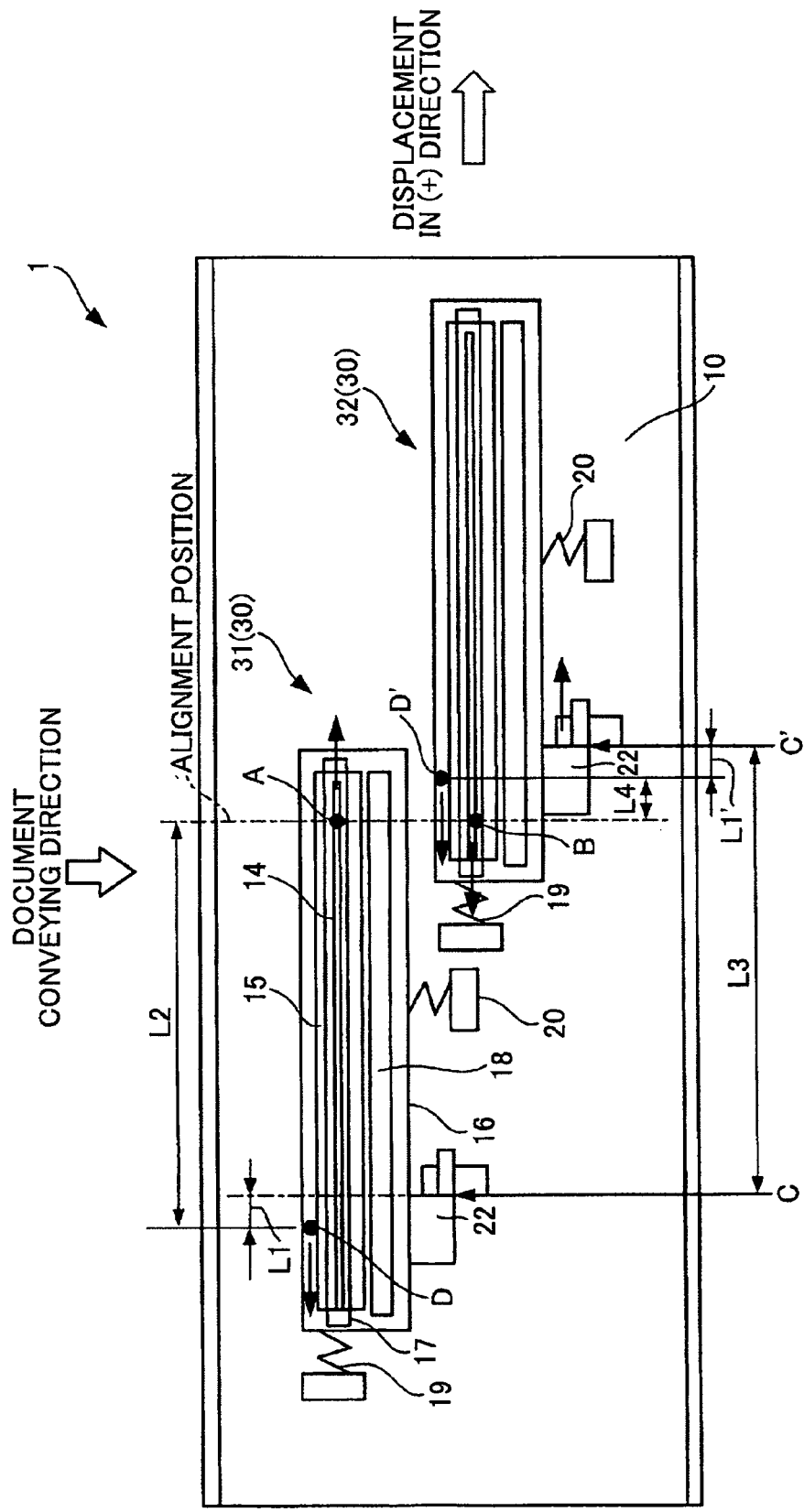
FIG. 9 is a drawing illustrating displacement of alignment points of CISs in a second case.

FIG. 9 shows a second case where the point D is to the left of the point C, the point B is to the left of the point C', and the point D' is between the points B and C'.

An amount of movement $\Delta A1$ of the sensor holder 16 of the first CIS 31 due to thermal expansion is represented by the amount of movement of the point D with respect to the point C. In the second case, the point D moves in the (−) direction by $\Delta A1 = -(L1 \times S3 \times \Delta t)$.

An amount of movement $\Delta A2$ of the sensor substrate 15 of the first CIS 31 due to thermal expansion is represented by the amount of movement of the point A with respect to the point D. In the second case, the point A moves in the (+) direction by $\Delta A2 = L2 \times S2 \times \Delta t$.

Accordingly, the total amount of movement $\Delta A$ of the point A, which is the alignment point of the first CIS 31, is represented by $\Delta A = \Delta A1 + \Delta A2 = -L1 \times S3 \times \Delta t + L2 \times S2 \times \Delta t$.

An amount of movement $\Delta B1$ of the sensor holder 16 of the second CIS 32 due to thermal expansion is represented by the amount of movement of the point D' with respect to the point C'. In the second case, the point D' moves in the (−) direction by $\Delta B1 = -(L1' \times S3 \times \Delta t)$.

An amount of movement $\Delta B2$ of the sensor substrate 15 of the second CIS 32 due to thermal expansion is represented by the amount of movement of the point B with respect to the point D'. In the second case, the point B moves in the (−) direction by $\Delta B2 = -(L4 \times S2 \times \Delta t)$.

An amount of movement $\Delta B3$ of the base part 10 due to thermal expansion is represented by the amount of movement of the point C' with respect to the point C. In the second case, the point C' moves in the (+) direction by $\Delta B3 = L3 \times S1 \times \Delta t$.

Accordingly, the total amount of movement $\Delta B$ of the point B, which is the alignment point of the second CIS 32, is represented by $\Delta B = \Delta B1 + \Delta B2 + \Delta B3 = -L1' \times S3 \times \Delta t - L4 \times S2 \times \Delta t + L3 \times S1 \times \Delta t$.

Here, since L2−L1=L3−L1'−L4 and L1=L1', L2=L3−L4 is true. Also, it is assumed that $S1 \approx S2$.

Therefore, $\Delta A$ equals $\Delta B$. This indicates that thermal expansion causes substantially no misalignment between the points A and B that are the alignment points of the first CIS 31 and the second CIS 32.

Figure 10:
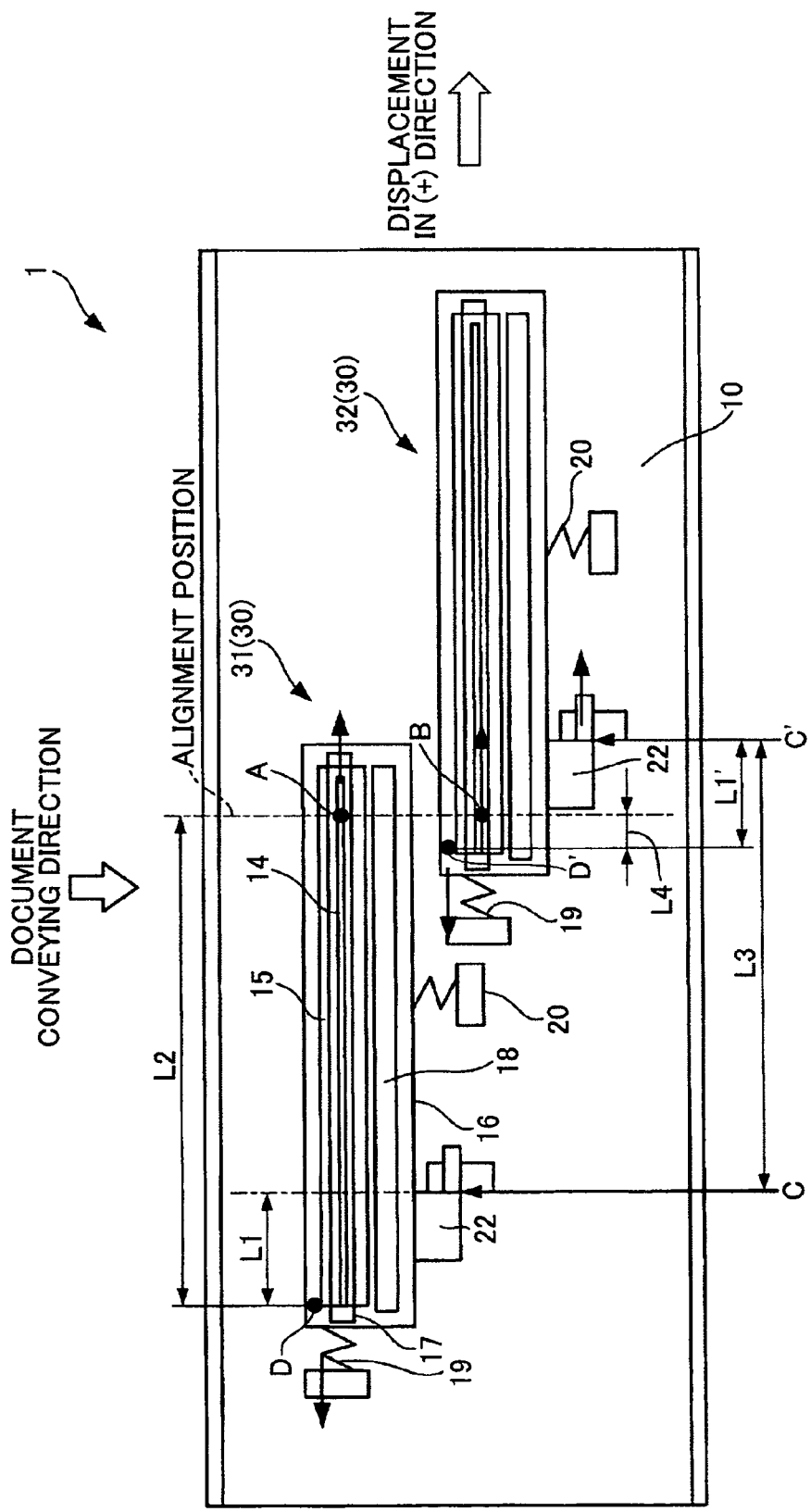
FIG. 10 is a drawing illustrating displacement of alignment points of CISs in a third case.

FIG. 10 shows a third case where the point D is to the left of the point C, the point B is to the left of the point C', and the point D' is to the left of the point B.

An amount of movement $\Delta A1$ of the sensor holder 16 of the first CIS 31 due to thermal expansion is represented by the amount of movement of the point D with respect to the point C. In the third case, the point D moves in the (−) direction by $\Delta A1 = -(L1 \times S3 \times \Delta t)$.

An amount of movement $\Delta A2$ of the sensor substrate 15 of the first CIS 31 due to thermal expansion is represented by the amount of movement of the point A with respect to the point D. In the third case, the point A moves in the (+) direction by $\Delta A2 = L2 \times S2 \times \Delta t$.

Accordingly, the total amount of movement $\Delta A$ of the point A, which is the alignment point of the first CIS 31, is represented by $\Delta A = \Delta A1 + \Delta A2 = -L1 \times S3 \times \Delta t + L2 \times S2 \times \Delta t$.

An amount of movement $\Delta B1$ of the sensor holder 16 of the second CIS 32 due to thermal expansion is represented by the amount of movement of the point D' with respect to the point C'. In the third case, the point D' moves in the (−) direction by $\Delta B1 = -(L1' \times S3 \times \Delta t)$.

An amount of movement $\Delta B2$ of the sensor substrate 15 of the second CIS 32 due to thermal expansion is represented by the amount of movement of the point B with respect to the point D'. In the third case, the point B moves in the (+) direction by $\Delta B2 = L4 \times S2 \times \Delta t$.

An amount of movement $\Delta B3$ of the base part 10 due to thermal expansion is represented by the amount of movement of the point C' with respect to the point C. In the third case, the point C' moves in the (+) direction by $\Delta B3 = L3 \times S1 \times \Delta t$.

Accordingly, the total amount of movement $\Delta B$ of the point B, which is the alignment point of the second CIS 32, is represented by $\Delta B = \Delta B1 + \Delta B2 + \Delta B3 = -L1' \times S3 \times \Delta t + L4 \times S2 \times \Delta t + L3 \times S1 \times \Delta t$.

Here, since $L2-L1=L3-L1'+L4$ and $L1=L1'$, $L2=L3+L4$ is true. Also, it is assumed that $S1 \approx S2$.

Therefore, $\Delta A$ equals $\Delta B$. This indicates that thermal expansion causes substantially no misalignment between the points A and B that are the alignment points of the first CIS 31 and the second CIS 32.

Figure 11:
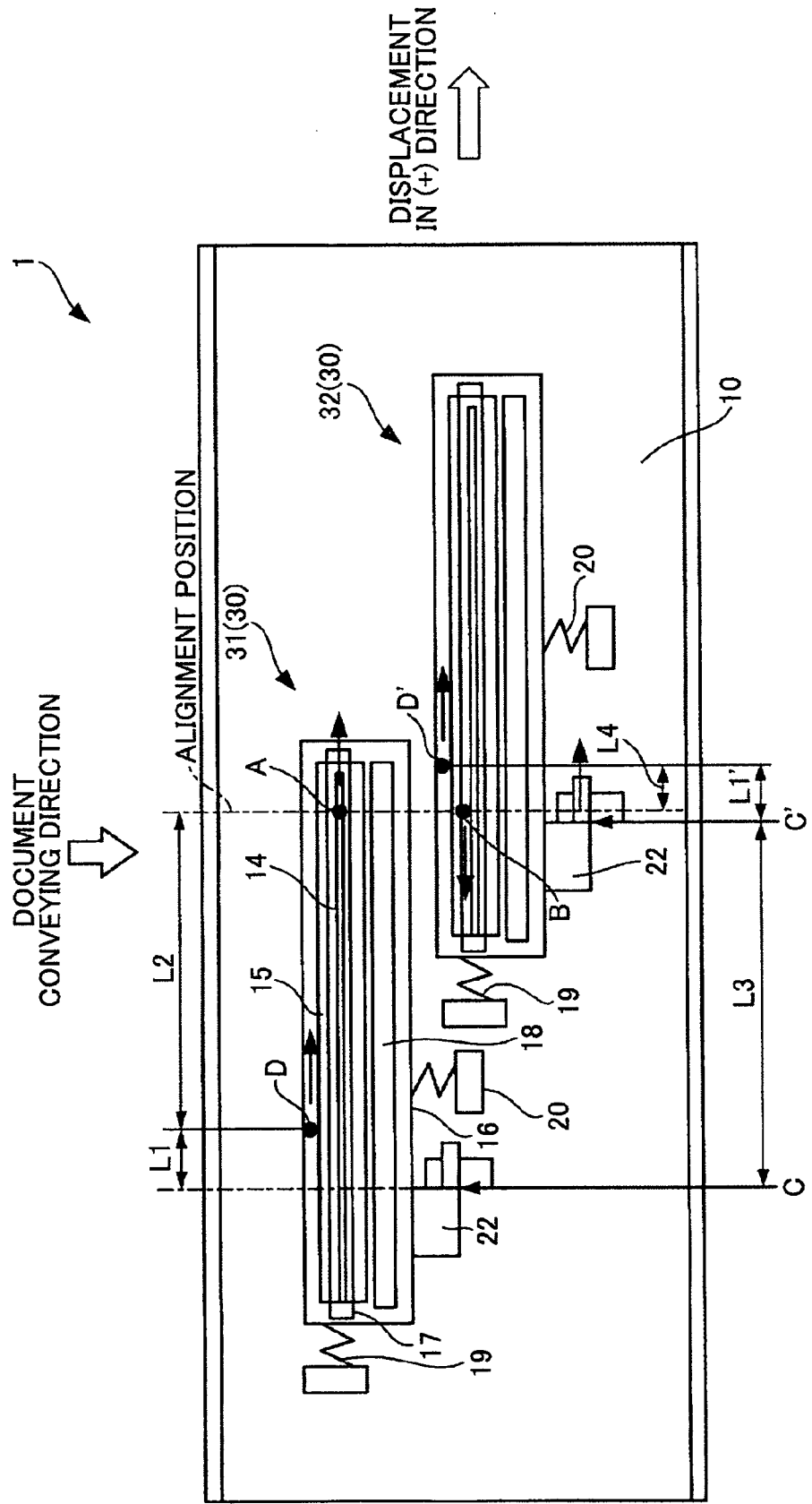
FIG. 11 is a drawing illustrating displacement of alignment points of CISs in a fourth case.

FIG. 11 shows a fourth case where the point D is to the right of the point C, the point B is to the right of the point C', and the point D' is to the right of the point B.

An amount of movement $\Delta A1$ of the sensor holder 16 of the first CIS 31 due to thermal expansion is represented by the amount of movement of the point D with respect to the point C. In the fourth case, the point D moves in the (+) direction by $\Delta A1 = L1 \times S3 \times \Delta t$.

An amount of movement $\Delta A2$ of the sensor substrate 15 of the first CIS 31 due to thermal expansion is represented by the amount of movement of the point A with respect to the point D. In the fourth case, the point A moves in the (+) direction by $\Delta A2 = L2 \times S2 \times \Delta t$.

Accordingly, the total amount of movement $\Delta A$ of the point A, which is the alignment point of the first CIS 31, is represented by $\Delta A = \Delta A1 + \Delta A2 = L1 \times S3 \times \Delta t + L2 \times S2 \times \Delta t$.

An amount of movement $\Delta B1$ of the sensor holder 16 of the second CIS 32 due to thermal expansion is represented by the amount of movement of the point D' with respect to the point C'. In the fourth case, the point D' moves in the (+) direction by $\Delta B1 = L1' \times S3 \times \Delta t$.

An amount of movement $\Delta B2$ of the sensor substrate 15 of the second CIS 32 due to thermal expansion is represented by the amount of movement of the point B with respect to the point D'. In the fourth case, the point B moves in the (−) direction by $\Delta B2 = -(L4 \times S2 \times \Delta t)$.

An amount of movement $\Delta B3$ of the base part 10 due to thermal expansion is represented by the amount of movement of the point C' with respect to the point C. In the fourth case, the point C' moves in the (+) direction by $\Delta B3 = L3 \times S1 \times \Delta t$.

Accordingly, the total amount of movement $\Delta B$ of the point B, which is the alignment point of the second CIS 32, is represented by $\Delta B = \Delta B1 + \Delta B2 + \Delta B3 = L1' \times S3 \times \Delta t - L4 \times S2 \times \Delta t + L3 \times S1 \times \Delta t$.

Here, since $L2+L1=L3+L1'-L4$ and $L1=L1'$, $L2=L3-L4$ is true. Also, it is assumed that $S1 \approx S2$.

Therefore, $\Delta A$ equals $\Delta B$. This indicates that thermal expansion causes substantially no misalignment between the points A and B that are the alignment points of the first CIS 31 and the second CIS 32.

Figure 12:
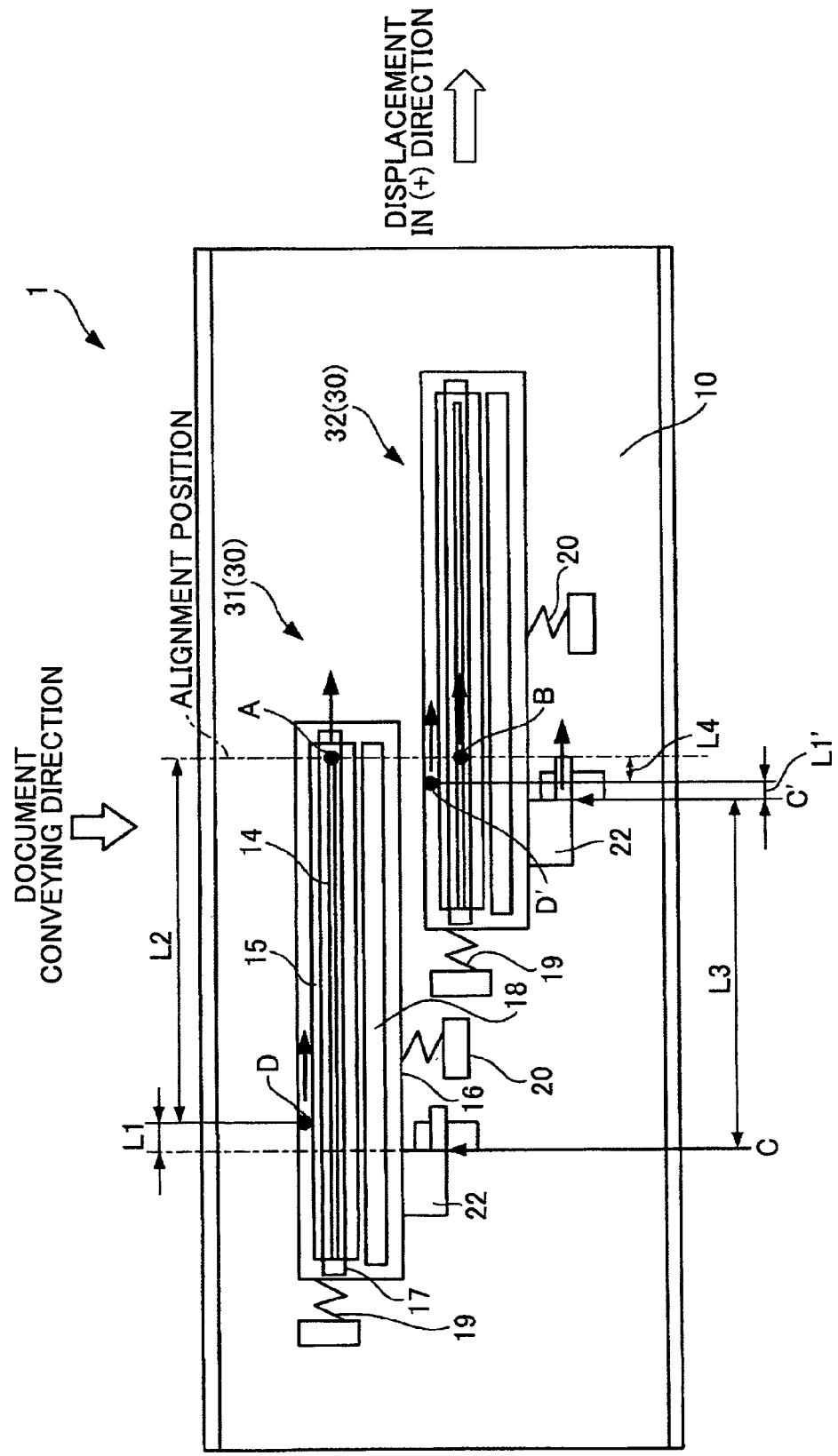
FIG. 12 is a drawing illustrating displacement of alignment points of CISs in a fifth case.

FIG. 12 shows a fifth case where the point D is to the right of the point C, the point B is to the right of the point C', and the point D' is between the points B and C'.

An amount of movement $\Delta A1$ of the sensor holder 16 of the first CIS 31 due to thermal expansion is represented by the amount of movement of the point D with respect to the point C. In the fifth case, the point D moves in the (+) direction by $\Delta A1 = L1 \times S3 \times \Delta t$.

An amount of movement $\Delta A2$ of the sensor substrate 15 of the first CIS 31 due to thermal expansion is represented by the amount of movement of the point A with respect to the point D. In the fifth case, the point A moves in the (+) direction by $\Delta A2 = L2 \times S2 \times \Delta t$.

Accordingly, the total amount of movement $\Delta A$ of the point A, which is the alignment point of the first CIS 31, is represented by $\Delta A = \Delta A1 + \Delta A2 = L1 \times S3 \times \Delta t + L2 \times S2 \times \Delta t$.

An amount of movement $\Delta B1$ of the sensor holder 16 of the second CIS 32 due to thermal expansion is represented by the amount of movement of the point D' with respect to the point C'. In the fifth case, the point D' moves in the (+) direction by $\Delta B1 = L1' \times S3 \times \Delta t$.

An amount of movement $\Delta B2$ of the sensor substrate 15 of the second CIS 32 due to thermal expansion is represented by the amount of movement of the point B with respect to the point D'. In the fifth case, the point B moves in the (+) direction by $\Delta B2 = L4 \times S2 \times \Delta t$.

An amount of movement $\Delta B3$ of the base part 10 due to thermal expansion is represented by the amount of movement of the point C' with respect to the point C. In the fifth case, the point C' moves in the (+) direction by $\Delta B3 = L3 \times S1 \times \Delta t$.

Accordingly, the total amount of movement $\Delta B$ of the point B, which is the alignment point of the second CIS 32, is represented by $\Delta B = \Delta B1 + \Delta B2 + \Delta B3 = L1' \times S3 \times \Delta t + L4 \times S2 \times \Delta t + L3 \times S1 \times \Delta t$.

Here, since $L2+L1=L3+L1'+L4$ and $L1=L1'$, $L2=L3+L4$ is true. Also, it is assumed that $S1 \approx S2$.

Therefore, $\Delta A$ equals $\Delta B$. This indicates that thermal expansion causes substantially no misalignment between the points A and B that are the alignment points of the first CIS 31 and the second CIS 32.

FIG. 13 shows a sixth case where the point D is to the left of the point C, the point B is to the right of the point C', and the point D' is to the left of the point C'.

An amount of movement $\Delta A1$ of the sensor holder 16 of the first CIS 31 due to thermal expansion is represented by the amount of movement of the point D with respect to the point C. In the sixth case, the point D moves in the (−) direction by $\Delta A1 = -(L1 \times S3 \times \Delta t)$.

An amount of movement $\Delta A2$ of the sensor substrate 15 of the first CIS 31 due to thermal expansion is represented by the amount of movement of the point A with respect to the point D. In the sixth case, the point A moves in the (+) direction by $\Delta A2 = L2 \times S2 \times \Delta t$.

Accordingly, the total amount of movement $\Delta A$ of the point A, which is the alignment point of the first CIS 31, is represented by $\Delta A = \Delta A1 + \Delta A2 = -L1 \times S3 \times \Delta t + L2 \times S2 \times \Delta t$.

An amount of movement $\Delta B1$ of the sensor holder 16 of the second CIS 32 due to thermal expansion is represented by the amount of movement of the point D' with respect to the point C'. In the sixth case, the point D' moves in the (−) direction by $\Delta B1 = -(L1' \times S3 \times \Delta t)$.

An amount of movement $\Delta B2$ of the sensor substrate 15 of the second CIS 32 due to thermal expansion is represented by the amount of movement of the point B with respect to the point D'. In the sixth case, the point B moves in the (+) direction by $\Delta B2 = L4 \times S2 \times \Delta t$.

An amount of movement $\Delta B3$ of the base part 10 due to thermal expansion is represented by the amount of movement of the point C' with respect to the point C. In the sixth case, the point C' moves in the (+) direction by $\Delta B3 = L3 \times S1 \times \Delta t$.

Accordingly, the total amount of movement $\Delta B$ of the point B, which is the alignment point of the second CIS 32, is represented by $\Delta B = \Delta B1 + \Delta B2 + \Delta B3 = -L1' \times S3 \times \Delta t + L4 \times S2 \times \Delta t + L3 \times S1 \times \Delta t$.

Here, since $L2-L1=L3-L1'+L4$ and $L1=L1'$, $L2=L3+L4$ is true. Also, it is assumed that $S1 \approx S2$.

Therefore, ΔA equals ΔB. This indicates that thermal expansion causes substantially no misalignment between the points A and B that are the alignment points of the first CIS 31 and the second CIS 32.

As described above with reference to FIGS. 8 through 13, with the image scanning device 1 of this embodiment, the directions and amounts of movement of the alignment point A of the first CIS 31 and the alignment point B of the second CIS 32 due to thermal expansion are substantially the same regardless of the positional relationships between the fixing points (displacement restricting positions) C and C' of the base part 10 and the sensor holder 16, the fixing points (displacement restricting positions) D and D' of the sensor substrate 15 and the sensor holder 16, and the alignment points A and B. This configuration makes it possible to prevent a change in the positional relationship in the main-scanning direction between the points A and B, and thereby makes it possible to prevent misalignment of pixels at the seam between the first CIS 31 and the second CIS 32.

Figure 14A:
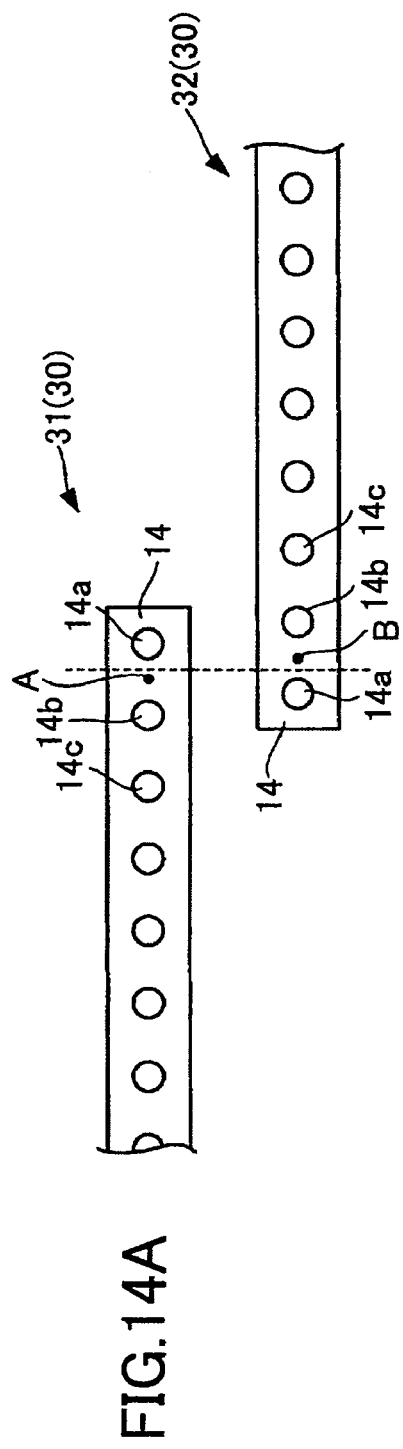
FIG. 14A is a drawing illustrating a case where the distance between corresponding scanning elements of adjacent CISs has increased due to thermal expansion.

In other words, the above embodiment makes it possible to prevent misalignment of the points A and B due to thermal expansion, and thereby makes it possible to prevent a problem as shown in FIG. 14A where the distance between the scanning element 14b of the line sensor 14 of the first CIS 31 and the scanning element 14b of the line sensor 14 of the second CIS 32 has been increased due to thermal expansion. This in turn makes it possible to prevent a decrease in the element density (dpi) at the seam between the first CIS 31 and the second CIS 32, and thereby makes it possible to prevent a problem where the width of an image scanned at the seam between the first CIS 31 and the second CIS 32 becomes smaller than the actual width.

Figure 14B:
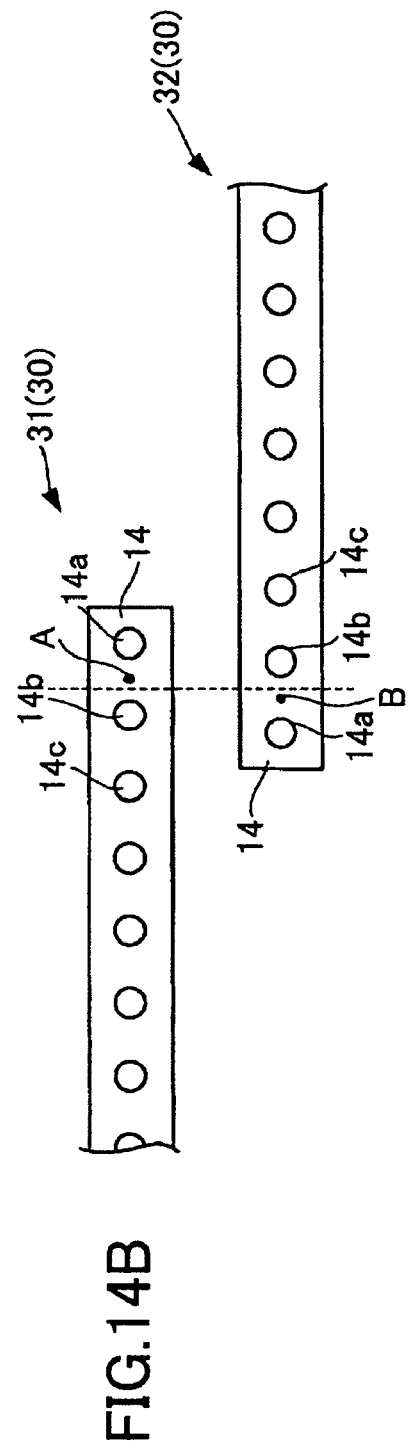
FIG. 14B is a drawing illustrating a case where the distance between corresponding scanning elements of adjacent CISs has decreased due to thermal expansion.

Further, the above embodiment makes it possible to prevent a problem as shown in FIG. 14B where the distance between the scanning element 14b of the line sensor 14 of the first CIS 31 and the scanning element 14b of the line sensor 14 of the second CIS 32 has been decreased due to thermal expansion. This in turn makes it possible to prevent an increase in the element density (dpi) at the seam between the first CIS 31 and the second CIS 32, and thereby makes it possible to prevent a problem where the width of an image scanned at the seam between the first CIS 31 and the second CIS 32 becomes greater than the actual width.

Here, if the increase or the decrease in the distance between the scanning element 14b of the line sensor 14 of the first CIS 31 and the scanning element 14b of the line sensor 14 of the second CIS 32 is about one half of the pixel pitch, the increase or the decrease has little influence on the image quality at the seam between the first CIS 31 and the second CIS 32.

According to the above embodiment, when, for example, the scanning width (the width of a part actually used for scanning) of each CIS 30 is 185 mm and the amount of temperature change Δt is 20° C., the amount of misalignment of the alignment points of the first CIS 31 and the second CIS 32 becomes $(12-11.7) \times 10^{-6} \times 185 \times 20 = 1.1$ μm. In this case, if the pixel density of the CIS 30 is 600 dpi (i.e., the pixel pitch is 42.3 μm), the misalignment of 1.1 μm is very small with respect to the 42.3 μm pixel pitch and has little influence on the image quality.

As described above, in the image scanning device 1 of this embodiment, multiple CISs 30 are arranged such that one or more scanning elements 14 at the ends of adjacent CISs 30 overlap each other in the main-scanning direction; the sensor substrate 15 and the base part 10 have substantially the same coefficient of linear expansion; the sensor holder 16 and the base part 10 are fixed together at the point C corresponding to the position of the second support part 22; the sensor holder 16 and the sensor substrate 15 are fixed together at the point D where the protrusion 25 is inserted into the hole 27; the distance in the main-scanning direction between the points C and D is the same for all the CISs 30; and the direction of the point D with respect to the point C is the same for all the CISs 30.

This configuration makes it possible to prevent misalignment of pixels at the seams between the CISs 30. Also, this configuration eliminates the need to connect adjacent CISs 30 by using an adhesive or screws and thereby makes it possible to prevent damaging the CISs 30.

Thus, the above embodiment makes it possible to prevent or reduce misalignment of the alignment points of the CISs 30 in the main-scanning direction due to thermal expansion without connecting adjacent CISs 30 to each other.

Also, an embodiment of the present invention provides the image forming apparatus 50 including the image scanning device 1 having a configuration to prevent or reduce misalignment of the alignment points of the CISs 30 in the main-scanning direction due to thermal expansion without connecting adjacent CISs 30 to each other.

Embodiments of the present invention provide an image scanning device and an image forming apparatus including the image scanning device having a configuration to prevent or reduce misalignment of alignment points of image sensors in the main-scanning direction that may be caused by thermal expansion without connecting adjacent image sensors to each other. An image scanning device according to an embodiment of the present invention may be applicable to an image forming apparatus such as a copier, a printer, or a facsimile machine.

The present invention is not limited to the specifically disclosed embodiments, and variations and modifications may be made without departing from the scope of the present invention.

The present application is based on Japanese Priority Application No. 2009-203733, filed on Sep. 3, 2009, the entire contents of which are hereby incorporated herein by reference.

What is claimed is:

1. An image scanning device, comprising:
   a plurality of image sensors each including
      a substrate,
      a line sensor including scanning elements photoelectrically converting light from a document, the scanning elements being arranged on the substrate in a main-scanning direction so as to form a line, and
      a holder holding the substrate; and
   a base part holding the image sensors such that the scanning elements at an end of one of the image sensors partly overlap the scanning elements at an end of an adjacent one of the image sensors in the main-scanning direction, wherein
   a coefficient of linear expansion of the substrate is substantially the same as a coefficient of linear expansion of the base part;
   the holder and the base part are fixed together at a first fixing point and the holder and the substrate are fixed together at a second fixing point;
   a distance in the main-scanning direction between the first fixing point and the second fixing point is the same for all the image sensors; and
   a direction of the second fixing point with respect to the first fixing point is the same for all the image sensors.

2. The image scanning device as claimed in claim 1, wherein the base part includes, for each of the image sensors, two first support parts each having a slide hole;

the holder of each of the image sensors includes two second support parts each including a slide pin; and the slide pins of the second support parts are movably fitted into the slide holes of the corresponding first support parts to hold the image sensors on the base part.

3. The image scanning device as claimed in claim 2, wherein the base part further includes a pressure spring for each of the image sensors, the pressure spring biasing, in the main-scanning direction, a corresponding one of the image sensors held on the base part by the first support parts and the second support parts.

4. The image scanning device as claimed in claim 3, wherein the pressure spring includes a protruding part sticking out toward the corresponding one of the image sensors to press an end of the corresponding one of the image sensors in the main-scanning direction.

5. The image scanning device as claimed in claim 3, wherein when each of the image sensors is being biased by the pressure spring in the main-scanning direction, one of the second support parts closer to the pressure spring is pressed against a corresponding one of the first support parts, and another one of the second support parts farther from the pressure spring is positioned at a distance in the main-scanning direction from another one of the first support parts.

6. The image scanning device as claimed in claim 5, wherein the first fixing point corresponds to a position of the one of the second support parts closer to the pressure spring.

7. The image scanning device as claimed in claim 1, wherein the holder of each of the image sensors includes a first protrusion and a second protrusion that are apart from each other in the main-scanning direction; and the substrate of each of the image sensors includes a first hole into which the first protrusion is inserted, the first hole having substantially a same diameter as a diameter of the first protrusion, and a second hole into which the second protrusion is inserted, the second hole having a minor axis in a sub-scanning direction that is substantially the same as a diameter of the second protrusion and a major axis in the main-scanning direction that is longer than the diameter of the second protrusion.

8. The image scanning device as claimed in claim 7, wherein the second fixing point corresponds to a position where the first protrusion is inserted into the first hole.

9. An image forming apparatus comprising the image scanning device as claimed in claim 1.

10. An image scanning device, comprising:

a plurality of image scanning units each including a substrate, photoelectric conversion means for photoelectrically converting light from a document, the photoelectric conversion means being arranged on the substrate in a main-scanning direction so as to form a line, and substrate holding means for holding the substrate; and image scanning unit holding means for holding the image scanning units such that the photoelectric conversion means at an end of one of the image scanning units partly overlap the photoelectric conversion means at an end of an adjacent one of the image scanning units in the main-scanning direction, wherein a coefficient of linear expansion of the substrate is substantially the same as a coefficient of linear expansion of the image scanning unit holding means;

the substrate holding means and the image scanning unit holding means are fixed together at a first fixing point and the substrate holding means and the substrate are fixed together at a second fixing point;

a distance in the main-scanning direction between the first fixing point and the second fixing point is the same for all the image scanning units; and a direction of the second fixing point with respect to the first fixing point is the same for all the image scanning units.

* * * * *